United States Patent
Linda et al.

(10) Patent No.: US 11,390,292 B2
(45) Date of Patent: Jul. 19, 2022

(54) METHOD FOR PROPOSING A DRIVING SPEED

(71) Applicant: COMPAGNIE GENERALE DES ETABLISSEMENTS MICHELIN, Clermont-Ferrand (FR)

(72) Inventors: Jean-Louis Linda, Clermont-Ferrand (FR); Christian Strahm, Clermont-Ferrand (FR); Marc Duvernier, Clermont-Ferrand (FR)

(73) Assignee: Compagnie Generale Des Etablissements Michelin, Clermont-Ferrand (FR)

( * ) Notice: Subject to any disclaimer, the term of this patent is extended or adjusted under 35 U.S.C. 154(b) by 113 days.

(21) Appl. No.: 16/303,322

(22) PCT Filed: May 22, 2017

(86) PCT No.: PCT/FR2017/051248
§ 371 (c)(1),
(2) Date: Nov. 20, 2018

(87) PCT Pub. No.: WO2017/198973
PCT Pub. Date: Nov. 23, 2017

(65) Prior Publication Data
US 2019/0210619 A1  Jul. 11, 2019

(30) Foreign Application Priority Data
May 20, 2016  (FR) ..................... 1654539

(51) Int. Cl.
*B60W 50/14* (2020.01)
*B60W 50/00* (2006.01)
(Continued)

(52) U.S. Cl.
CPC .......... *B60W 50/14* (2013.01); *B60W 40/064* (2013.01); *B60W 50/0097* (2013.01);
(Continued)

(58) Field of Classification Search
CPC ............... B60W 50/14; B60W 40/064; B60W 50/0097; B60W 50/082; G01C 21/30
(Continued)

(56) References Cited

U.S. PATENT DOCUMENTS 6,836,719 B2  12/2004  Andersson et al.
8,370,013 B2   2/2013  Linda et al.
(Continued)

FOREIGN PATENT DOCUMENTS

EP  1 302 356 A1   4/2003
EP  2 537 727 A1  12/2012
(Continued)

OTHER PUBLICATIONS

International Search Report dated Aug. 1, 2017, in corresponding PCT/FR2017/051248 (6 pages).

Primary Examiner — Peter D Nolan
Assistant Examiner — Wae L Louie
(74) Attorney, Agent, or Firm — Venable LLP (57) ABSTRACT

A method for proposing a driving speed for a driver at the steering wheel of a vehicle comprises the following steps: estimating the maximum available grip potential at a given instant between a tyre of the vehicle and the roadway on a predetermined upcoming route; determining, among a set of predetermined driving styles, secure styles for which the grip requirement on the predetermined route remains lower than the grip potential; selecting, among said secure styles, a secure comfortable style according to a driver profile; and determining, according to said secure comfortable style and
(Continued)

to a location of the vehicle, a basic proposed driving speed on an upcoming section of route.

10 Claims, 3 Drawing Sheets

(51) Int. Cl.
    *B60W 40/064*     (2012.01)
    *B60W 50/08*     (2020.01)
    *G01C 21/30*     (2006.01)

(52) U.S. Cl.
    CPC ...... *B60W 50/0098* (2013.01); *B60W 50/082* (2013.01); *G01C 21/30* (2013.01); *B60W 2050/006* (2013.01); *B60W 2050/0026* (2013.01); *B60W 2050/146* (2013.01); *B60W 2420/54* (2013.01); *B60W 2552/40* (2020.02); *B60W 2556/50* (2020.02); *B60W 2720/103* (2013.01); *Y02T 10/40* (2013.01)

(58) Field of Classification Search
    USPC .......................................................... 701/93
    See application file for complete search history.

(56) References Cited

U.S. PATENT DOCUMENTS

| | | | |
|---|---|---|---|
| 8,527,177 B2* | 9/2013 | Linda | B60T 8/172 701/74 |
| 9,187,097 B2 | 11/2015 | Levin et al. | |
| 9,707,974 B2 | 7/2017 | Filev et al. | |
| 2003/0093209 A1 | 5/2003 | Andersson et al. | |
| 2011/0295457 A1 | 12/2011 | Linda et al. | |
| 2012/0203399 A1 | 8/2012 | Filev et al. | |
| 2012/0326856 A1* | 12/2012 | Levin | B60W 50/14 701/1 |
| 2013/0018562 A1 | 1/2013 | Nakai et al. | |
| 2013/0190980 A1* | 7/2013 | Ramirez Ruiz | B60G 17/0162 701/38 |
| 2014/0039749 A1* | 2/2014 | Jelbert | B60W 40/09 701/32.1 |
| 2017/0341659 A1 | 11/2017 | Duvernier et al. | |
| 2018/0170391 A1* | 6/2018 | Duvernier | B60W 30/045 |
| 2019/0106108 A1* | 4/2019 | Wienecke | B60W 30/162 |
| 2019/0176835 A1* | 6/2019 | Gandar | B60W 50/14 |
| 2019/0210619 A1* | 7/2019 | Linda | B60W 50/14 |

FOREIGN PATENT DOCUMENTS

| | | |
|---|---|---|
| FR | 2 997 670 A1 | 5/2014 |
| WO | 2011/053304 A1 | 5/2011 |

\* cited by examiner

METHOD FOR PROPOSING A DRIVING SPEED

FIELD OF THE INVENTION

The present invention relates to the field of motor vehicles, and particularly to the field of driving assistance systems and devices for such vehicles.

Motor vehicles are currently equipped with numerous items of equipment for improving the safety of the driver and of the passengers of a vehicle. Thus, anti-lock braking systems (ABS) are known for preventing the wheels from locking in the event of heavy braking. Electronic stability programs (ESP) are also known, which allow vehicle skidding to be avoided by controlling the trajectory.

The development of these systems has been facilitated by the installation of numerous electronic devices in the vehicles and by the implementation of increasingly powerful electronic computers, allowing significant computation power to be placed on board motor vehicles without additional bulk.

In order to avoid accidents, particularly in difficult meteorological or driving conditions, it would appear to be useful to be able to estimate the risks relating to the loss of grip of a vehicle in a driving situation. Such a loss of grip occurs when the forces that the vehicle will demand in terms of tyre/roadway contact i.e. the grip requirement, are greater than the potential of the tyre and of the roadway to withstand such forces i.e. the maximum available grip potential.

Various solutions are known from the prior art that allow the available grip potential to be estimated between a tyre and the roadway on which the tyre is running. Some of these solutions are based on stressing the grip potential up to a certain level, for example, half the maximum potential, and propose deducing therefrom, by extrapolation, the maximum available potential. However, these solutions require a manoeuvre close to the grip limit, which does not allow a sufficient safety margin to be provided for the vehicle driver, particularly in conditions with a low level of grip.

Finally, approaches are known that are based on vehicle equilibrium models and on trajectory tracking hypotheses defined a priori according to the cartography. These approaches are expensive and cannot take into account the complexity of the manoeuvres that are actually performed by the drivers, which include various elements unknown to the systems, such as visibility, anticipation of intersections, corner sequencing.

The present invention aims to overcome these disadvantages by proposing a solution that allows the grip potential to be determined in real time and to be used to provide a vehicle and/or its driver with a speed proposal to be followed when driving in conditions that are optimized in terms of comfort and safety.

BRIEF DESCRIPTION OF THE INVENTION

Thus, the invention relates to a method for proposing a driving speed for a driver at the steering wheel of a vehicle, the method comprising the following steps of:
  estimating the available grip potential at a given instant between a tyre of the vehicle and the roadway on a predetermined upcoming route;
  determining, among a set of predetermined driving styles, secure styles for which the grip requirement on the predetermined route remains lower than the grip potential;
  selecting, among said secure styles, a secure comfortable style according to a driver profile;
  determining, according to said secure comfortable style and to a location of the vehicle, a basic proposed driving speed on an upcoming section of route.

It is to be noted herein that this proposal method is implemented for a vehicle for which the route is considered to be predetermined. In a first instance, the vehicle knows the destination and the roads taken, for example, because the driver has programmed their route via a navigator installed in the vehicle.

In the event that the route is not programmed, a method according to the invention preferably comprises an initial step involving tying the vehicle to an actual road. This step, called "map matching", involves regularly comparing GPS positions of the vehicle with cartographic data, in order to determine the road taken, which then constitutes the predetermined route to the next intersection.

Consequently, throughout the description, the steps, for example, determining a grip requirement, must be considered as being performed for this previously identified predetermined route. It is to be noted herein that the term "upcoming route" is understood to mean not only geographical coordinates of points forming a route, but also information relating to the slope and the camber of the route, which parameters do not appear merely from reading GPS coordinates.

I—Estimating a Grip Potential

I-1—Determining Influential Parameters

In one particular embodiment, a method according to the invention comprises an initial step of determining parameters influencing the grip potential, with these parameters being included within the group comprising the grip number of the roadway, the sand patch depth of the road or the average texture depth, called PMT, the water depth on the roadway, the temperature of the ambient air, the driving speed and all the features of the tyre that influence grip, particularly, but not exclusively, the tyre pressure, its tread depth, its load and the type of tyre.

These influential parameters are supplied directly by the vehicle and/or are supplied by an external system and/or are measured in real time. Thus, for example, the grip number of the roadway can be supplied by pre-existing maps. The temperature can be measured in real time, for example, by sensors that are currently available on a vehicle.

The parameters of the tyre, such as the pressure, the tread depth, the load and the driving speed can be determined by systems on board the vehicle or in the tyres.

In one particular embodiment, the initial step of determining influential parameters comprises a step of measuring the acoustic power generated by the tyre during driving, and a step of determining the water depth on the roadway and the tread depth according to this acoustic power. In another particular embodiment, the macro-texture of the road is also determined according to this acoustic power. To this end, the vehicle in which a method according to the invention is implemented must be provided with a microphone installed in the vicinity of the tyres or in the front or rear bumpers of the vehicle.

The number of parameters having a potential impact on the noise of the tyre can be significant. However, it would appear that some parameters have a low or second-order influence on the type of noise generated by the tyre. This can be the case, for example, for the internal pressure of the tyre or even the load of the tyre.

Thus, it would appear that the meteorological state of the road, characterized by a water depth on the roadway, seems to be a first-order parameter. It has a very high impact on tyre noise and is certainly only slightly dependent on all the other parameters, such as the state of the road surface, the state of wear of the tyre or even the type of tyre tread. These other parameters are also likely, to a lesser extent, to vary the driving noise as long as their inherent acoustic signatures can be discerned.

With respect to this water depth, a distinction is made between a dry road and a damp road, characterized by a water depth that is flush with the natural roughness of the road surface, or a wet road, for which the water depth exceeds the level of the natural roughness of the road surface.

In one embodiment, this water depth on the road is estimated using one of the means included in the group comprising:
  fixed weather stations installed on roadsides and comprising means for communicating the water depth to the vehicles driving on the route as they pass by;
  optical sensors on board the vehicle;
  analytical models allowing a residual water depth to be estimated according to known meteorological data (amount of rain, sunshine, etc.) or of road-related data (drainability, camber, traffic, etc.).

With respect to the average texture depth, a surface is considered to be a closed surface when it assumes a smooth and macro-roughness free appearance, such as, for example, bitumen that has been softened after being subjected to high heat. A surface will be considered to be open when there is significant macro-roughness, such as the macro-roughness of a worn surface or that of a country road quickly repaired using a superficial coating produced by projecting gravel onto the bitumen. A medium surface describes all the surfaces in an intermediate state between the two aforementioned states and, more specifically, describes new surfaces. It is thus possible for the various macro-textures to be categorized as follows: a closed macro-texture surface has a PMT of between 0 and 0.4 millimetres. A medium macro-texture surface has a PMT of between 0.4 and 1.1 millimetres and an open macro-texture surface has a PMT of more than 1.1 millimetres. It is known that the macro-roughness of a surface significantly influences the noise generated by the tyre. In particular, the phenomenon of pumping air trapped between the ground and the tyre tread is even more pronounced when the road surface is closed. Real time knowledge of the state of a road can prove to be useful in the event that, for example, this information is feedback by a large number of vehicles, or by a fleet of dedicated vehicles, to a centralized system for monitoring and maintaining the road network.

With respect to the tread depth of the tyre, which characterizes its state of wear, a distinction is made between the new state, the worn state and an intermediate state, which herein is considered to be the mid-wear state of the tyre. Information relating to the evolution of the wear characteristic over time is useful, especially if it is associated with the information relating to the meteorological state of the road. Indeed, it is known that a vehicle fitted with worn tyres that drives on a wet surface is more likely to risk losing its grip than if it had new tyres.

In one embodiment, the estimate of a remaining tread depth is provided in real time by one of the means included in the group comprising:
  sensors on board the tyre;
  optical sensors assessing the evolution of the tread depth, with these sensors being on board the vehicle or installed on the ground;
  magnetic sensors;
  on board wear models taking into account the mileage covered, the wear, the vehicle type, wear measurement points produced by mechanical or optical means, etc.

The type of tyre tread is, for example, a summer type tread or a winter type tread. These two types of tyres are basically distinguished by tyre treads with different, more directional, heavily grooved and slotted treads in the case of winter treads, and less directional and less grooved treads in the case of summer treads, as well as by the type of materials forming the tread, softer in the case of winter tyres and harder in the case of summer tyres. These features will have a bearing on the behaviour and the road handling of the vehicle, and thus on its grip.

I-2—Method Using a Mathematical Model

Knowing the influential parameters, several embodiments are contemplated for determining the available grip potential. In a first preferred embodiment, a mathematical formula is thus used that allows this grip potential to be estimated according to the speed. Thus, the potential can be computed as follows:

$\mu_{max}$=f (micro-roughness of the ground, speed, sand depth, water depth, tread depth, inflation pressure, load). This function is specific to each approved tyre that is accessible on the market. All or some of the parameters provided in this expression have previously been measured and/or determined beforehand, as previously described.

I-3—Method Using Charts

In another embodiment, the step of determining a grip potential according to the speed is performed by implementing predetermined grip level charts. In this embodiment, several steps are implemented, which will be described in detail hereafter with reference to the figures:
  grip level charts are constructed according to influential parameters;
  the values of these parameters are measured in real time;
  the chart corresponding to the values of the parameters is selected; and
  the estimated value of the grip potential is read on the chart for the actual driving speed.

I-4—Method Using Rolling Radius

In another embodiment of the present invention, the step of determining an available grip potential comprises the following steps:
  assessing the evolution of a rolling radius of the tyre according to predetermined driving conditions of said tyre on ground surfaces with variable and known grips, in order to compile an experimental database;
  establishing, on the basis of the experimental database, a model for estimating the grip potential by determining a function connecting the grip potential to the rolling radius and to the vehicle parameters;
  determining, as the tyre runs, the rolling radius and, by applying said model and according to the vehicle parameters, assessing the grip potential of said tyre.

Once the available grip potential is estimated, it is then possible for a driving style to be determined that will subsequently allow a driving speed to be proposed in light of this grip potential.

III—Determining a Secure Comfort Style

III-1—Defining a Driving Style

In order to provide the most appropriate possible speed proposal, previously defined driving styles or categories will be used. The driving styles allow speed profiles to be determined, which will allow the speed proposal to be offered to a driver according to the driving style that would have been determined, the predetermined route and the location of the vehicle on this route.

In order to determine driving categories, a previous observation has been made of the speed and/or the acceleration of a certain number of individuals on the predetermined route and a hierarchical classification is completed on all the available observations. It is to be noted herein that the variables are recorded at a frequency inherent to the recording means. These variables are not statistically considered to be continuous curves, but to be a set of timely observations. Thus, a set of observations is associated with each individual for each of these passages.

The principle of this classification is, by using a suitable notion of distance, to consolidate the users into styles, each of which is as homogeneous as possible and, between them, as distinct as possible. In one embodiment, the styles are such that the intra-style variance is minimized, whereas the inter-group variance is maximized.

Advantageously, in order to complete the classification, the speed and/or the acceleration of an individual is recorded during several journeys over the same course, with each journey resulting in a set of observations. In order to define the distance between two users, the distance between the reference speeds and/or accelerations is computed for each of these users.

In such a hierarchical classification, the number of styles used is selected retrospectively and is considered to be suitable if the inter-style variance does not significantly decrease by adding a style.

Thus, in one embodiment of the present invention, the use of six styles has been contemplated to minimize the inter-style variance. However, it has been noted that equally relevant results were obtained with four styles. Therefore, this number of four styles is preferably selected for the sake of economy. This actually allows the necessary computation power and computation times to be reduced.

Still for the sake of economy, in one embodiment, the categories are determined not by using all the available observations, but by only using some of these observations. For example, the observations of relevant driving zones will be selected, such as corners or high acceleration zones.

The relevant driving zones are determined, for example, by virtue of a map of the driving zone or by virtue of vehicle behaviour as it travels through these zones, with the behaviour being, for example, analysed in light of a speed and/or an acceleration of the vehicle in these zones. It is then possible for the various driver categories and their associated speed profiles to be stored in the vehicle.

III-2—Secure Styles

Knowing the available grip potential on the upcoming route, it is possible to determine, among all the driving styles, which styles are "secure", namely which styles propose a speed profile which prevents the available grip potential from being exceeded. To this end, in one embodiment, the acceleration is computed that will be experienced by the vehicle for each of the driving styles according to tables of speed profiles on the predetermined route, and on the resulting grip requirement.

The route corresponds to the geometry of the road on which the vehicle is travelling, it is defined by a set of points, the coordinates of which are a priori known for a predetermined route. For the sake of simplicity, the trajectory taken by the driver on the road can be assimilated, uniquely for each of the drivers, with the route that defines the road and is common to all the drivers. A table of points is then available that defines an approximate trajectory that will be taken by the driver and that allows the instantaneous curvature $\rho=1/R$ of the route (where R is the curvature radius) to be computed at each point. With the curvature being known, the speeds of the driving styles allow the instantaneous transverse acceleration to be computed at each point that is experienced by the vehicle using the relation $\gamma_y = V^2 \cdot \rho = V^2/R$.

The speeds of the driving styles also allow computation of the longitudinal acceleration $\gamma_x = dV/dt$ at any point. By firstly considering a vehicle modelled by a material point, these accelerations, expressed as G, reflect the consumed grip, and this is the case for each style. It is then possible to determine, among all the driving styles, the driving styles for which the grip consumed on an upcoming route is less than the available grip potential, and thus ensures secure driving.

In a preferred embodiment, the upcoming route is divided into a set of segments and the computation is performed on each of these segments. The most detrimental segment is then used to determine whether or not each of the styles allows compliance with the limit fixed by the available grip potential.

III-3—Selection of a Style

The driving style implemented in the vehicle will be selected among the styles identified as being secure in view of the potential grip of the upcoming route. In order to make the selection among these secure styles, it is advantageous to select the style that will be most comfortable for a driver, namely that which is closest to their profile, which is referred to as "preferred style" throughout the remainder of the application.

The preferred style can be expressly selected by the driver themselves, for example, via a graphic interface present in the vehicle. It is to be noted herein that in an advantageous embodiment, the driver can choose to change the preferred style while driving.

In another embodiment, the preferred style is identified in the vehicle via an identification process loaded into a computer of the vehicle. In this case, advantageously, the identified style is proposed to the driver, who has the possibility, via a graphic interface, of confirming this identified style. The identified style also can be automatically confirmed as the preferred style, without any intervention from the driver, based on duration or distance covered criteria with an activated activation process.

Thus, by knowing all the secure styles, and the preferred style, it is possible to determine a secure comfort style. In the event that the preferred style is a secure style, it is selected as a secure comfort style. In the event that the preferred style is not secure, the style that is as close as possible to the preferred style will be selected from the set of secure styles.

With the driving style having been selected, the corresponding speed profile is then known on a given route. Based on these elements, it will then be possible, under certain conditions that are defined hereafter, to propose a secure comfort speed to the vehicle and/or its driver.

IV—Determining a Proposed Speed

IV-1—Locating the Vehicle

To this end, it is worthwhile, in one embodiment, to know the geolocation of the vehicle, namely its GPS coordinates. The vehicle will then be considered to be "located". It is then possible to associate the location of the vehicle with a position in the table of the speed profiles of the route considered for the selected driving style. This table actually associates a speed with each coordinate of the route, and does so for each identified driving style.

When the vehicle has been located a first time, regular checks are carried out to confirm that it effectively remains on the considered route. These checks correspond, for example, to a route distance check or to a heading check between the vehicle and the considered route.

When the vehicle is in an "unlocated" state, an attempt is made to locate said vehicle, i.e. to bring it to a known and identified route in the profiles of the driving styles. To this end, the point closest to the actual position of the vehicle is sought over the entire considered route. In one embodiment, the closest segment is subsequently determined, which is formed from the closest point and from the second closest point. The orthogonal distance between the vehicle and the segment is then computed. As long as this distance is greater than a predetermined threshold, the vehicle is considered to be still unlocated. In a preferred embodiment, this threshold is set between five and fifteen metres and, more preferably, to ten metres.

If the orthogonal distance between the vehicle and the segment drops below the predetermined threshold, then a deviation is determined between the heading of the vehicle and the heading of the segment. If this deviation is below a predetermined threshold, for example, 90°, the vehicle is then considered to be located. Otherwise, the vehicle remains in an unlocated state.

In this unlocated state, it is difficult to propose a relevant speed. Consequently, preferably, the location process will be relaunched as long as the vehicle is in an unlocated state.

IV-2—Basic Speed Proposal

With the vehicle being located on a known segment, and a driving style having been selected, it is possible to determine the speed of the profile at the two ends of the segment, which correspond to two points of the table of the profiles associated with the driving style. To this end, in one embodiment, an interpolation is carried out between the speeds of the two points to determine a speed at the position of the vehicle. This interpolation is carried out, for example, by solving an equation of uniformly accelerated movement.

The determination of this basic speed proposal will be described hereafter with reference to the figures. In one embodiment of the invention, this basic proposal will be the speed proposed to the vehicle and/or to the driver.

IV-3—Speed Limitation

However, it has been noted that this basic speed sometimes has to be limited by other elements of the environment. These elements are, for example, included in the group comprising: a legal speed limit, grip and/or meteorological conditions. These elements can be detected, for example, via reading information on the CAN bus of the vehicle. Indeed, if the driver detects a deterioration in the driving conditions, they will be able to perform an action, such as turning on hazard warning lights, fog lights, etc., which will be visible on the data circulating on the CAN bus of the vehicle.

Thus, in another embodiment, the speed proposed to the vehicle corresponds to the basic proposal limited by a factor depending on the aforementioned events.

In one example, this speed limitation is carried out in the form of clipping the proposed basic speed in order to remain within secure conditions.

However, it has been noted that simple clipping can introduce a discontinuity into the driving and can be perceived, in the vehicle, as a lack of behavioural homogeneity on the route. Consequently, in an improved embodiment of the invention, the speed limitation will be performed via a change of driving style of the driver. Indeed, by transitioning to a driving style with lower dynamics, it will be possible to remain within the speed limits that are required in light of the external events, whilst maintaining homogenous behaviour on the route.

IV-3—Processing Transients

If such switching of the style is performed, it is worthwhile, in one embodiment of the invention, to provide a mechanism for managing the transition from one style to another.

It is to be noted herein that the transition mechanism that will be described is applicable irrespective of the style changeover conditions, i.e. whether it is a change of style dictated by the vehicle and/or selected by the driver.

Style changeover implies transitioning from the speed of a style currently selected in the vehicle to a new style, even though the profile speeds of the two styles do not necessarily evolve in the same way. Thus, in order to ensure continuity, a weighted average is completed between the speeds of the two styles on a considered route segment, and this speed is proposed to the vehicle.

Advantageously, this average is computed as follows: $V_i = k_i \cdot V_{initialStyle\ i} + (1 - k_i) \cdot V_{EndStyle\ i}$, with k being the weighting, allowing the weight of the initial style to progressively transition from 100% to 0%, and in a complementary manner for the target style.

This transition mechanism will be described hereafter with reference to the figures.

IV-4—Driver Warning or Information Device

In one embodiment, a method according to the invention comprises a step of displaying, in the vehicle, the previously determined proposed speed, which is called recommended speed herein.

This display can assume several forms, for example, a form of a recommended speed for the next corner or even a recommended speed at a particular point located at a certain distance. Furthermore, the display can implement a colour code providing an indication that the recommended speed is not a comfort speed, but is a limit speed due to a limited grip potential.

Furthermore, with the recommended speed being determined by anticipation, it is worthwhile, in one embodiment of the invention, to take into account the available grip potential in real time in order to warn the driver of a risk of non-compliance at the end of this condition. Thus, in certain situations, it is worthwhile to notify the vehicle driver that there is still time to brake if they want to be able to comply with the recommended speed for the next corner. This warning can be in the form of an audible or visual warning, for example, by flashing the speed display.

IV-4—Regulation—Limitation of the Vehicle

In another embodiment, a method according to the invention comprises a step of transmitting the recommended speed to a driving assistance system installed in the vehicle. Thus, for example, if the vehicle has a longitudinal control system, it is possible to slave the recommended speed.

In another embodiment, the recommended speed can be used as a maximum speed implemented in a speed limiter.

BRIEF DESCRIPTION OF THE FIGURES

Further aims and advantages of the invention will become clearly apparent throughout the following description of a preferred but non-limiting embodiment, illustrated by the following figures, in which.

DESCRIPTION OF THE BEST EMBODIMENT OF THE INVENTION

Figure 1:
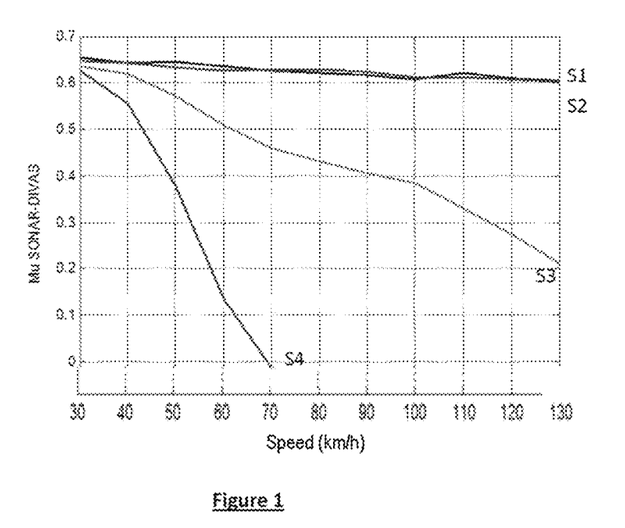
FIG. 1 shows an example of charts that can be used in a method according to the invention for determining a grip potential.

FIG. 1 shows an example of charts that can be used in a method according to the invention for determining a grip potential.

Preferably, the charts are configured according to influential parameters that are available when the invention is implemented, for example, the water depth and the tread depth, and are plotted according to the driving speed.

The number of charts to be created therefore is a function of the number of values of these magnitudes that will be measured. Typically, if it is known that two wear levels (new/worn) and two humidity state levels (dry/wet) will be measured, four charts will be created that correspond to the possible combinations of these two states. If some combinations result in very similar grip results, then the number of charts can be reduced.

The charts are constructed in several steps:
- initially, a statistical distribution of each of the model inputs is determined. As many charts are computed as there are combinations of these parameters, but each one is computed with a very limited standard deviation around the value of the measured parameter. Typically, the identification of a worn tyre allows the distribution to be reduced to 2 mm f 1.5 mm instead of 5 mm±4 mm without this information. The precision of the grip estimate therefore is significantly improved;
- a random selection is made of N combinations selected in these distributions of the input parameters (typically N=1,000 or 10,000);
- N variations of µ are computed with these N combinations for P speed cases (typically 11 speed cases ranging from 30 to 130 km/h in 10 km/h increments);
- thus, N curves µ(V) are plotted, each corresponding to one selection among N combinations of input parameters;
- finally, the percentile is extracted from this set of curves that is of interest according to the targeted estimation risk, for example, the limit of the lowest 10% or 1% of µ;
- on completion of this step, a curve µ(V) is therefore available for each possible combination of influential parameters.

Thus, FIG. 1 shows four curves, in which:
S1 is the available grip for a new tyre on a damp road;
S2 is the available grip for a worn tyre on a damp road;
S3 is the available grip for a new tyre on a wet road; and
S4 is the available grip for a worn tyre on a wet road.

It is clear from the following example that this information creates 3 very different styles of grip potential.

This approach allows the amount of information to be stored to be reduced without losing prediction quality, since the precise computations are carried out upstream of the operation.

Figure 2:
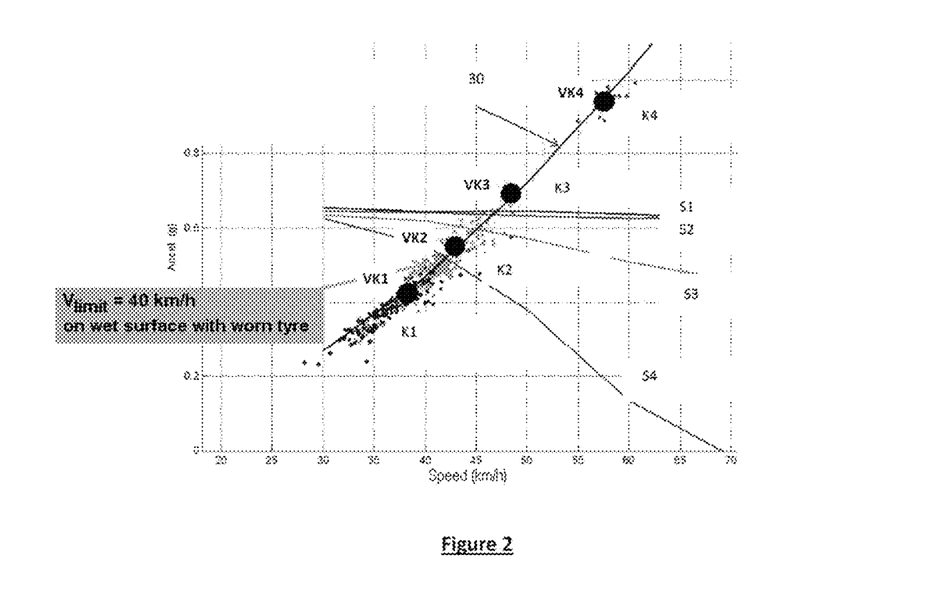
FIG. 2 will be used to describe the mechanism for determining secure styles.

FIG. 2 shows the mechanism for determining secure styles according to an available grip potential, it shows the behaviour observed for the various drivers at a point of a particular corner of the predetermined route. In this operating case, it is assumed that four driver categories have been previously determined, the curve 30 shows four groups of points, called K1, K2, K3 and K4, corresponding to the grip requirement called up by the various drivers in the various driving categories. The points VK1, VK2, VK3 and VK4 represent the speeds obtained by statistical processing that are stored in the vehicle for this coordinate of the route and that are respectively proposed for the four predetermined driver categories. This figure also shows four curves S1, S2, S3 and S4 showing the available grip according to the speed for four combinations of influential parameters, on the same route:
S1 is the available grip for a new tyre on a damp road;
S2 is the available grip for a worn tyre on a damp road;
S3 is the available grip for a new tyre on a wet road; and
S4 is the available grip for a worn tyre on a wet road.

In this operating mode, knowing the status of the influential parameters, a method according to the invention allows the determination of, among the speed proposals VK1 to VK4, those that prevent the available grip potential from being exceeded. For example, if the vehicle is fitted with new tyres and the road is damp, the secure styles will be the styles corresponding to speeds VK1 and VK2. A selection will be subsequently made, among these two styles, of the style that is closest to a comfort style for the driver.

In the event that category 2 will be selected and the road will become wet, for example, following a change of weather, category 2 simply needs to be switched to category 1 to determine a proposed driving speed. This operating mode is particularly advantageous since it allows a reduction in the number of computations performed in real time in the vehicle, and thus reduces the necessary resources.

Figure 3A:
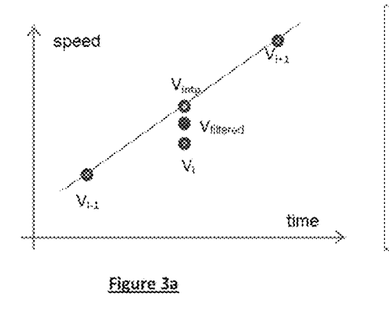
FIGS. 3a and 3b will be used to describe the speed proposal mechanism implemented in one embodiment of the invention.

Then, by knowing the selected driving style, it is possible to determine a recommended speed profile for the upcoming route. If the vehicle is located at a point belonging to the table of speed profiles, the speed is determined immediately. However, if the vehicle is located between two points i−1 and i+1, as shown in FIG. 3a, an interpolation needs to be made between the speeds $V_{i-1}$ and $V_{i+1}$ by solving an equation of uniformly accelerated movement to determine a recommended speed, shown as $V_{intp}$ in FIG. 3a.

Figure 3B:
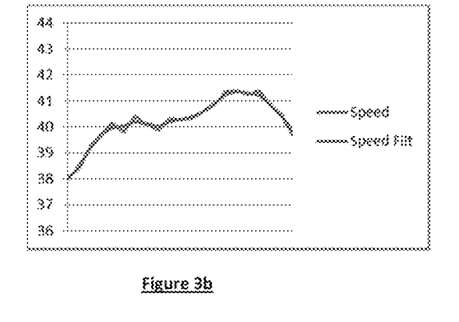

It is to be noted herein that, in a preferred embodiment, even if the vehicle is located at a point i belonging to the table of the profiles of a driving style, the speed setpoint can be slightly distorted due to the noise of the setpoint. In order to improve the speed proposal, this setpoint can be filtered by carrying out a weighted average between the speed $V_i$ at the point i and an interpolated speed $V_{intp}$ between points i−1 and i+1. The result of this average is a speed $V_{filtered}$, as shown in FIG. 3b.

Furthermore, as previously stated, it is worthwhile, in some cases, to implement a change of driving style. However, in order to ensure homogeneity with respect to the driving behaviour, it is worthwhile to provide a transition mechanism when transitioning from an initial style to a target style. This mechanism is shown in FIGS. 4a and 4b.

Figure 4A:
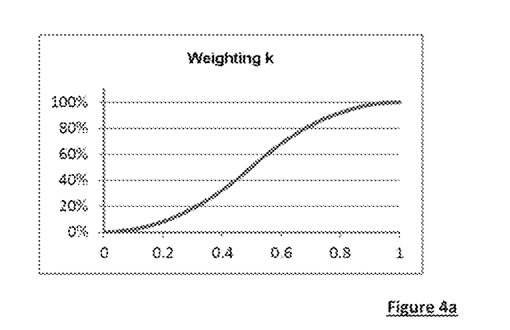
FIGS. 4a and 4b will be used to describe the transition mechanism implemented in one embodiment of the invention.
Figure 4B:
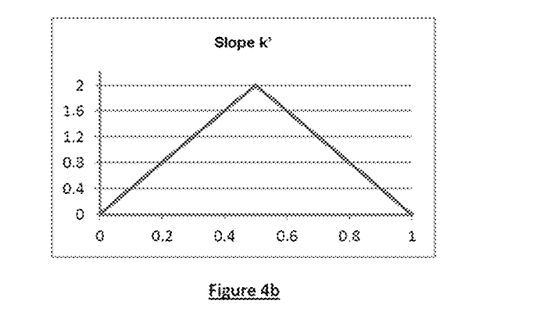

As previously stated, the continuity is obtained by completing a weighted average between the proposed speed in light of the initial style and the proposed speed in light of the target style. The invention then implements a step of simultaneously computing the speeds of the two styles, progressively transitioning the weight of the initial style from 100% to 0%, while the weight of the target style transitions in a complementary manner from 0% to 100%:

$V_i = k_i \cdot V_{initialStyle\ i} + (1-k_i) \cdot V_{EndStyle\ i}$, with k being the weighting shown in FIG. 4a.

The smoothness of the transition is obtained by being tangent to the speeds of the styles at the start and at the end of the manoeuvre. To this end, the weighting evolves over time according to functions of degree 2 or higher, the slope of which is zero at the start and at the end of the transition and is maximum at the midway point. The weighting represents a speed deviation to be overcome, the slope k', shown in FIG. 4b, therefore reflects an acceleration.

If the transition has to be performed within a given time, particularly in light of a driving risk, the transition acceleration is dictated by this time. However, if this time is adjustable, and by considering that the speed deviation is stable (the two speeds vary in substantially the same manner over a short time frame), the duration of the transition can be determined for a transition acceleration that is dictated according to the following relation:

$t_{trans} = 2*(V_{TargetStyle} - V_{InitialStyle})/\alpha_{trans}$, where $t_{trans}$ is the transition time and $a_{trans}$ is the maximum transition acceleration corresponding to FIG. 4b.

In the event of a transition to a lower style ($V_{TargetStyle} < V_{InitialStyle}$), the transition acceleration is clearly negative.

Figure 5A:
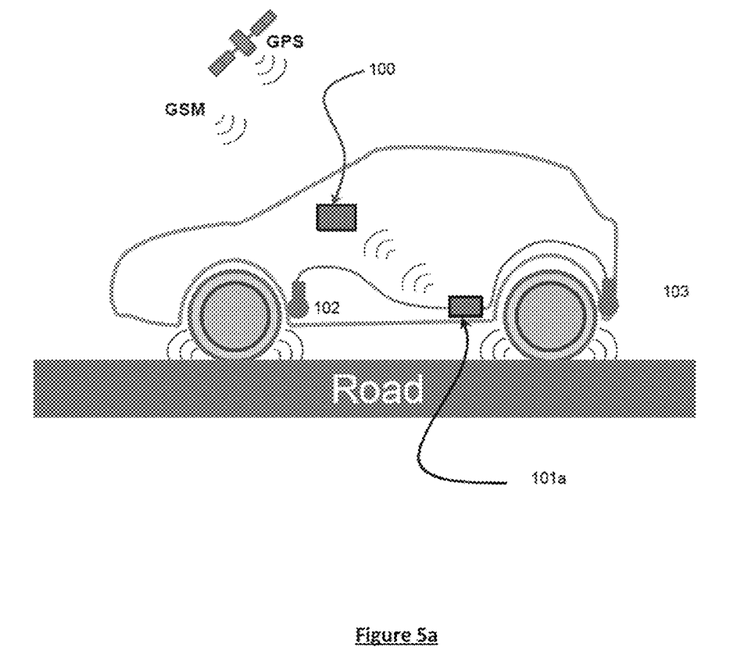
FIGS. 5a and 5b show embodiments of a method according to the invention in a vehicle.
Figure 5B:
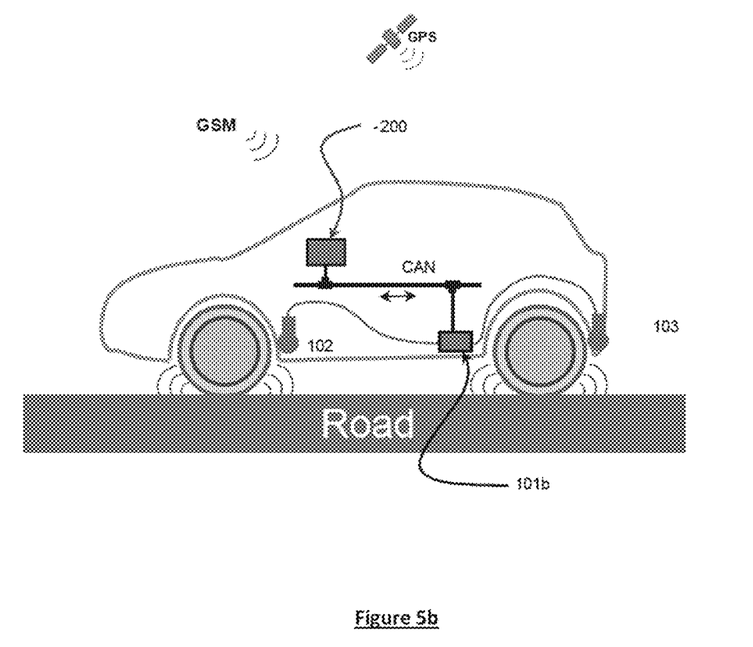

FIGS. 5a and 5b show embodiments of a method according to the invention in a vehicle. FIG. 5a more specifically shows an embodiment using a connected device, which is not integrated in the vehicle, of the smartphone or tablet type. Thus, in this embodiment, the device 100 comprises GSM communication means allowing external data to be received, such as maps or traffic or other information. Furthermore, the device 100 comprises means for receiving information allowing GPS geolocation of the vehicle or the speed of the vehicle to be determined.

The vehicle also comprises a computer 101a installed in the vehicle and connected to various sensors, such as microphones 102 and 103. This computer 101a comprises means for processing signals originating from the sensors 102 and 103 in order to obtain information relating to a water depth on the road, a texture depth of the road, a state of wear or pressure of the tyre. In another embodiment, not shown in the figure, the vehicle further comprises other sensors, such as temperature, wear, pressure sensors, etc., installed directly on the vehicle and/or on the tyres. In this case, the computer 101a comprises means for processing signals originating from all the sensors. After processing, the information is sent from the computer 101a to the device 100, which implements a method according to the invention for determining a recommended speed and displaying it on a screen integrated in the device 100.

In the example shown in FIG. 5b, a method according to the invention is implemented directly in the computer 101b of the vehicle. As before, this computer is connected to sensors 102 and 103, which have the same functions as in the example of FIG. 5a. However, in this example, the computer 101b is connected to the CAN bus of the vehicle, in order to read information such as the speeds and/or accelerations of the vehicle.

The display and control module 200 integrated in the vehicle comprises GSM communication means that allow external data to be received, such as maps or information relating to traffic or other information, and means for receiving information allowing GPS geolocation of the vehicle. It can make this information available to the computer 101b on the CAN communication bus.

This module 200 is also provided with display means for displaying the recommended speed, in order to notify the driver.

In one embodiment, the features of the tyre are taken into account in order to implement the method. To this end, these features are stored in a memory of the vehicle, and/or a tyre identifier is read by an RFID type reader, and associated with features stored in a database, and/or the grip model implemented in the computer 101b or in the device 100 is selected from a set of grip models according to a tyre identifier.

The invention claimed is:

1. An apparatus-implemented method for proposing a driving speed for a driver at the steering wheel of a vehicle, the method comprising the steps of:
    measuring acoustic power generated by a tire of the vehicle during driving using a microphone installed in a vicinity of the tire or in front or rear bumpers of the vehicle;
    estimating, by at least one sensor comprising the microphone, the available grip potential at a given instant between the tire of the vehicle and the roadway on a predetermined upcoming route, wherein at least one parameter that influences the available grip potential is stored in a memory and selected from the group consisting of average texture depth of the roadway, water depth on the roadway, tire wear and tire pressure;
    processing a signal originating from the at least one sensor by a computer installed in the vehicle;
    determining, among a set of predetermined driving styles, secure styles for which the grip requirement on the predetermined route remains lower than the grip potential;
    selecting, among said secure styles, a secure comfortable style according to a driver profile; and
    determining, according to said secure comfortable style and to a location of the vehicle, a basic proposed driving speed on an upcoming section of route.

2. The method according to claim 1, wherein determining a basic proposed driving speed comprises a step of interpolating between two speeds corresponding to two points of the route recorded in a table of the speed profiles of the secure comfortable style.

3. The method according to claim 1, further comprising an initial step of map matching allowing the upcoming route to be known.

4. The method according to claim 1, further comprising a step of limiting the proposed basic speed according to surrounding parameters.

5. The method according to claim 4, wherein the step of limiting the speed comprises a change of secure comfortable style.

6. The method according to claim 1, wherein the step of determining secure styles comprises a step of determining, on the upcoming route, the acceleration that will be experienced by the vehicle for each of the driving styles according to tables of speed profiles and to the resulting grip requirement.

7. The method according to claim 1, wherein the step of selecting a secure comfort style comprises selecting, among the secure styles, the style closest to a style preselected by the driver or pre-identified by the vehicle according to the driver profile.

8. The method according to claim 1, further comprising a step, before determining a proposed speed, of checking the location of the vehicle.

9. The method according to claim 1, further comprising a step of displaying the proposed speed in the vehicle.

10. The method according to claim 1, further comprising a step of transmitting the recommended speed to a driver assistance system installed in the vehicle.

* * * * *